United States Patent [19]

Radochonski

[11] Patent Number: 5,016,191

[45] Date of Patent: May 14, 1991

[54] HALF TONING PIXEL PROCESSOR

[75] Inventor: Pierre A. Radochonski, Lake Oswego, Oreg.

[73] Assignee: Tektronix, Inc., Portland, Oreg.

[21] Appl. No.: 239,736

[22] Filed: Sep. 2, 1988

[51] Int. Cl.[5] ............................................. G06F 15/62
[52] U.S. Cl. .................................... 364/518; 364/519; 364/524; 340/750; 400/83
[58] Field of Search .................... 364/518, 521, 519; 340/706, 728; 358/75, 283, 284; 400/63, 83, 126; 346/1.1, 140 R

[56] References Cited

U.S. PATENT DOCUMENTS

| | | | |
|---|---|---|---|
| 4,591,850 | 5/1986 | Lundström | 340/799 |
| 4,737,916 | 4/1988 | Ogawa et al. | 364/443 |
| 4,794,554 | 12/1988 | Tamiya | 364/710.01 |
| 4,811,239 | 3/1989 | Tsao | 364/519 |
| 4,860,026 | 8/1989 | Matsumoto et al. | 346/1.1 |
| 4,930,018 | 5/1990 | Chan et al. | 358/298 |

Primary Examiner—Gary V. Harkcom
Assistant Examiner—Phu K. Nguyen
Attorney, Agent, or Firm—John D. Winkelman; John P. Dellett

[57] ABSTRACT

A pixel processor converts data indicating origin, direction, length and intensity of each of a set of lines forming a picture into a half tone bit map on the picture. The pixel processor organizes the picture into an array of similar half tone cells, each half tone cell being a rectangular array of pixels, by storing adjustable data indicating the size of a half tone cell and a pixel intensity threshold level for each pixel of a half tone cell. When processing each line, the pixel processor reads pixel data words out of the bit map, each pixel data word including at least one bit corresponding to a pixel along the path of the line. For each such bit, the pixel processor determines the half tone cell position of the corresponding pixel, determines whether the pixel intensity threshold level assigned to that half tone cell position is lower than the intensity level of the line and sets the state of the bit accordingly. After suitably altering relevant bits of each pixel data word, the pixel processor writes the altered pixel data word back into the bit map memory.

18 Claims, 7 Drawing Sheets

FIG.1A  HALF TONE PATTERN

FIG.1B  INTENSITY 100

FIG.1C  INTENSITY 50

FIG.1D  INTENSITY 75

HALF TONING PIXEL PROCESSOR

BACKGROUND OF THE INVENTION

The present invention relates to pixel processors for converting high level picture descriptions to bit maps controlling pixel based displays, and in particular to a pixel processor providing bit maps for half tone displays.

A typical laser, ink jet or impact type dot matrix printer organizes a page to be printed into an array of dots, or pixels, and selectively inks ("turns on") various pixels of the array to produce a printed page. An internal or external computer controls the printer in response to pixel data words of the bit map of a page to be printed. Each bit of each pixel data word corresponds to a pixel and indicates whether the printer is to turn on the corresponding pixel.

An object-oriented graphic design system describes, manipulates and stores a graphic design using a high level picture description, a set of data describing various graphic objects forming the design. For example, a picture description may describe a rectangle by indicating coordinates of its corners, the thickness of its edges, its fill pattern and other attributes. A computer internal or external to the printer converts the picture description into a bit map when a user requests a print out of the graphic design.

Dot matrix printers generate a graphic page by selectively inking or not inking various pixels, and all pixels are inked with the same intensity. However, half toning techniques are often employed to print a graphic design including graphic objects having varying levels of apparent color or monochrome intensity. In a half toning system, a page to be printed is mapped onto an array of half tone cells, each half tone cell itself being a small rectangular array of pixels. Each pixel of a half tone cell is assigned a different intensity threshold level, for example, from 1 to 100, and each graphic object in a design is assigned an intensity level also on a scale of 1 to 100. The picture description indicates the intensity level of each graphic object. When the pixel processor processes the picture description to create a bit map, it compares the desired intensity level of the object to the intensity threshold level of each pixel included in the object. If the intensity threshold level is less than the intensity level of the object, the pixel processor sets the bit corresponding to the pixel so that the pixel forms a part of the object in the print out. Otherwise the pixel processor does not set the bit. For an object of intensity 100, all pixels covered by the object are turned on because all pixels have assigned intensity threshold levels of 100 or less. For an object of intensity 50, perhaps only half of the pixels covered by the object turn on because these pixels have assigned intensity levels greater than 50. Since pixels are small and closely spaced the gaps in an object caused by the missing pixels are not readily apparent to an observer. However, since fewer pixels form an object of intensity 50 than an object of intensity 100, the intensity 50 object appears fainter than the intensity 100 object.

Half toning can add depth, shading and other interesting effects to a graphic print, but the additional processing steps required for a computer to implement a half tone scheme substantially increases the time required by the computer to convert a picture description into a bit map.

SUMMARY OF THE INVENTION

The present invention is a pixel processor suitable for use as a stage in a picture processing system as described and claimed in co-pending U.S. Pat. application Ser. No. 07/239,875 filed Sept. 2, 1988, entitled SINGLE BUS GRAPHICS DATA PROCESSING PIPELINE, and Ser. No. 07/240,855 filed Sept. 2, 1988, entitled DYNAMICALLY CONFIGURABLE, DEMAND DRIVEN DATA PROCESSING PIPELINE. In this system a general purpose main processor within the picture processing system converts a high level picture description relating a picture as a set of complex graphic objects into data describing the same picture as a set of lines, each line having an origin, length, direction and intensity.

In accordance with one aspect of the invention, the pixel processor converts the line descriptions from the main processor into a bit map for a half tone picture. The pixel processor initially stores input data from the main processor indicating intensity threshold levels for each pixel of a half tone cell. When processing each line, the pixel processor addresses and reads a succession of pixel data words out of the bit map, each pixel data word including at least one bit corresponding to a pixel along the path of the line. For each such bit, the pixel processor determines the half tone cell position of the corresponding pixel, determines whether the intensity threshold level assigned to that half tone cell position is lower than the intensity level of the line and sets the state of the bit accordingly. After suitably altering relevant bits of each pixel data word, the pixel processor writes the altered pixel data word back into the bit map memory at the same address.

In accordance with another aspect of the invention, the pixel processor stores input data from the main processor describing dimensions of the half tone cell and the pixel intensity threshold data associated with each pixel of the half tone cell. Thus, before initiating processing of a picture, the main processor may alter the half toning scheme used by the pixel processor.

It is accordingly an object of the invention to provide an improved pixel processor for rapidly converting descriptions of lines forming a picture to a half tone bit map of the picture.

It is another object of the invention to provide an improved pixel processor for producing bit maps carrying out a half tone scheme for representing graphic objects with varying levels of apparent intensity.

It is a further object of the invention to provide an improved pixel processor for producing half tone display bit maps wherein dimensions and intensity threshold levels of half tone cells may be programmably altered.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

DESCRIPTION OF THE PREFERRED EMBODIMENT(s)

Figure 1A:
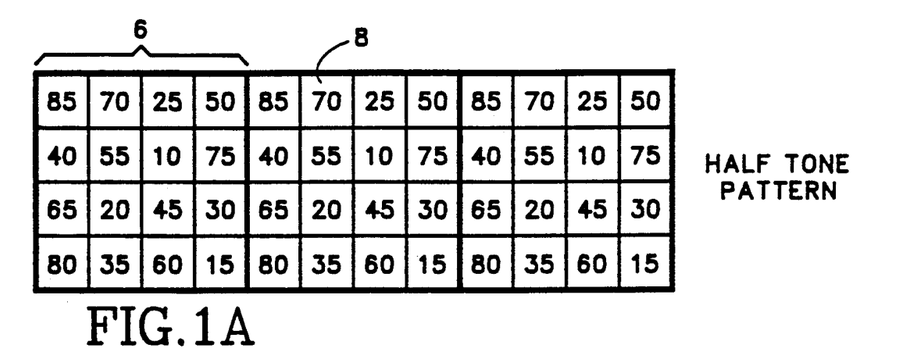
FIG. 1A illustrates three adjacent half tone cells.

Dot matrix type printers generate graphic prints by selectively inking or not inking various pixels on a page. Since the amount of ink forming each pixel is fixed, a printer cannot make graphic objects appear more or less intensely colored by varying the intensity of individual pixels forming the objects. However, a half toning system in accordance with the present invention adjusts the apparent color intensity of graphic objects by adjusting the number of pixels forming each object. FIGS. 1A–1D illustrate half toning whereby pixels forming a graphic page are mapped into an array of half tone cells. FIG. 1A illustrates three horizontally adjacent half tone cells 6 of such an array, each comprising a rectangular array of pixels 8. FIGS. 1A–1D represent pixels by small squares and represent half tone cells by large squares. Although each half tone cell 6 of FIG. 1A is a 4×4 array of pixels 8, half tone cells of other dimensions are commonly used. Each pixel 8 of a half tone cell 6 has an assigned intensity threshold level represented in FIG. 1A by a number superimposed on the small square for the pixel. Note that all half tone cells are similar in size and shape and that pixels similarly positioned within arrays forming different half tone cells are assigned the same intensity threshold level.

Figure 1B:
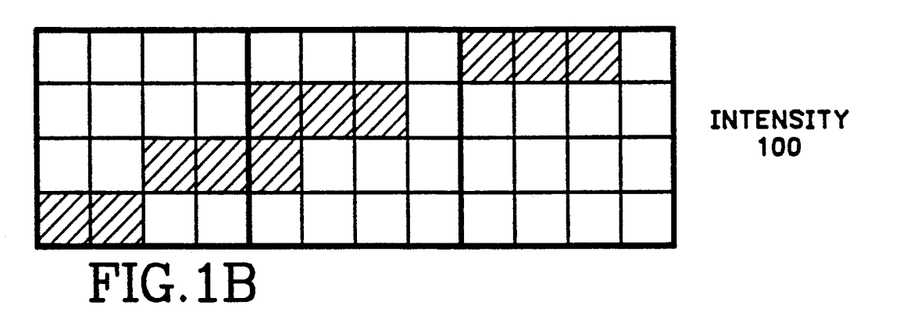
FIGS. 1B–1D illustrate how lines of varying intensity levels are drawn across the cells of FIG. 1A.
Figure 1C:
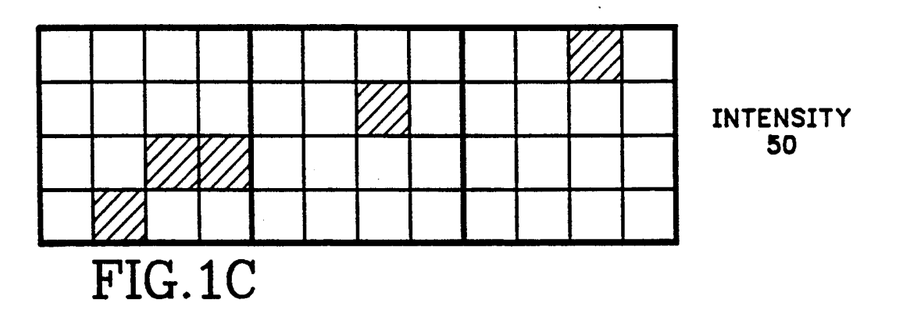
Figure 1D:
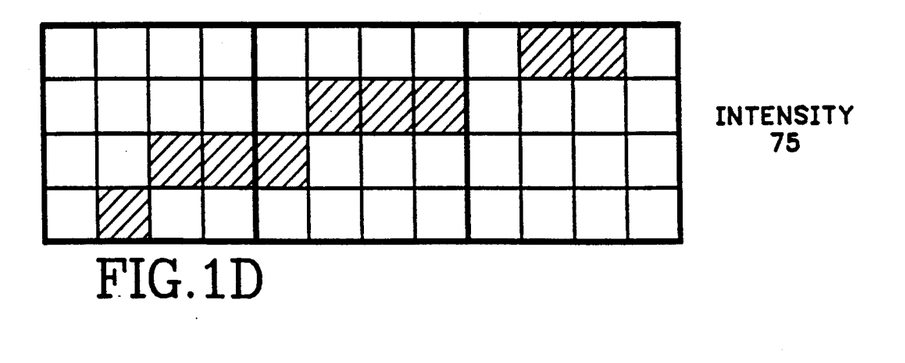

Each graphic object included in a graphic design also has an assigned intensity level, for example, from 1 to 100. If the intensity level associated with a pixel within the bounds of an object is less than the intensity level of the object, the pixel turns on. Otherwise, the pixel does not turn on. FIG. 1B illustrates how a graphic object, here a line of intensity 100, is printed across the three half tone cells of FIG. 1A. Since all pixels of each half tone cell have assigned intensity levels less than 100, all pixels in the path of the line turn on. FIG. 1C illustrates a similarly directed line of intensity 50 printed across the three half tone cells. Since some of the pixels along the path of the line have intensity threshold levels greater than 50, those pixels do not turn on. Although the line of FIG. 1C has gaps between pixels forming it, the pixels are small and closely spaced and the gaps in the line are not readily apparent to an observer. However, since the line of FIG. 1C includes fewer pixels than the line of FIG. 1B, the line of FIG. 1C appears less intense in color, fainter, than the line of FIG. 1B. FIG. 1D illustrates a line of intensity 75 drawn across the three half tone cells. This line appears more intense than the line of FIG. 1C but less intense than the line of FIG. 1B.

Three color dot matrix printers generate color pictures by printing pixels in three primary colors, for example cyan, magenta, and yellow. The printed page is organized into three overlapping pixel arrays, each array including pixels of a separate one of the primary colors. Since the pixels are small and closely spaced, the combination of various colors of turned on pixels forming an object determines the apparent "color" of the object. Multiple color half toning is generally similar to monochrome half toning, as illustrated in FIGS. 1A–1D, except each graphic object printed has a different intensity level associated with each of the three primary colors. A pixel of a particular color turns on to form a part of a graphic object when the assigned intensity of the object for that particular color equals or exceeds the intensity threshold assigned to the pixel. Thus, the color and apparent intensity of an object is determined by the relative intensities assigned to the three primary colors. Three color systems typically simulate a black pixel by inking adjacent pixels of all three primary colors. Four color printers print black pixels directly.

Figure 2:
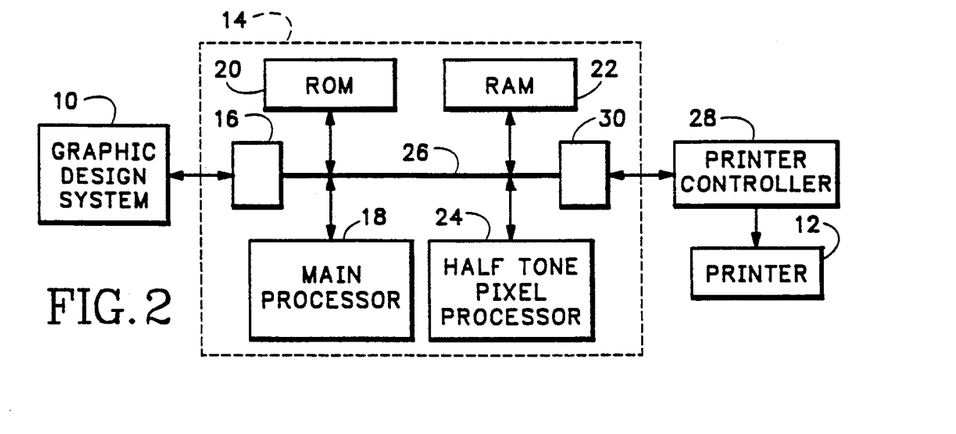
FIG. 2 illustrates in block diagram form a computer-aided graphic design and printing system including a half tone pixel processor in accordance with the present invention.
Figure 3:
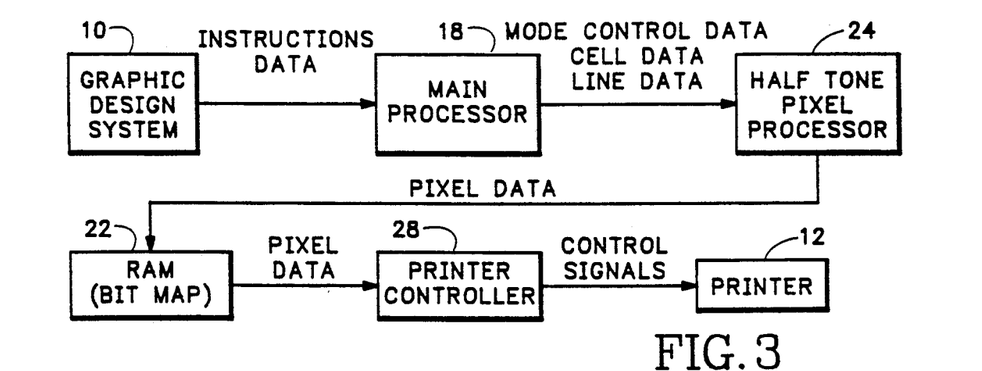
FIG. 3 is a data flow diagram illustrating operation of the system of FIG. 2.

FIG. 2 illustrates in block diagram form relevant portions of a graphic design and printing system including a half toning pixel processor 24 of the present invention. FIG. 3 depicts data flow through the system. Referring to FIGS. 2 and 3, a computer-aided graphic design system 10 produces a high level picture description of a picture to be printed by a printer 12. The high level description relates the picture as a set of graphic objects (lines, rectangles, circles, etc.) having various attributes (color, fill pattern, thickness, etc.) and positioned at particular locations on a page. When the picture is to be printed, the graphics design system 10 transmits a sequence of data conveying the picture description to a pixel processing system 14 via port 16. The pixel processing system includes a main processor 18 (suitably a Motorola model 68020), a read only memory (ROM) 20, a random access memory (RAM) 22, and half tone pixel processor 24, all connected to a bus 26. Port 16 directs incoming picture description data onto bus 26. Operating under instructions in ROM 20 and RAM 22 and employing RAM 22 for temporary data storage, main processor 18 converts the input high level picture description into data setting forth the same picture as a set of pixel lines. Data describing each line forming the picture indicates coordinates of one end of the line on the page (its origin), a direction of the line from the origin, the length of the line (i.e., the number of pixels spanned by the line), and its color intensity.

Main processor 18 transmits data describing each line to half tone pixel processor 24 via bus 26. Pixel processor 24 processes the data to determine which pixels of the graphic page to be printed are to be inked ("turned on") to form the line and accordingly updates a bit map of the page in a portion of RAM 22. The bit map is a set of addressable, 32-bit pixel data words. Each bit of each pixel data word corresponds to a particular pixel on the page and indicates whether the corresponding pixel is to be turned on or off when the page is printed. When processing a line description, the pixel processor addresses and reads a succession of pixel data words out of the bit map, each pixel data word including at least one bit corresponding to a pixel along the path of the line. For each such bit, the pixel processor determines whether the corresponding pixel is to be turned on or off according to a predetermined half toning scheme and sets the state of the bit accordingly. After processing and altering relevant bits of a pixel data word, the pixel processor writes the altered pixel data word back into the bit map in RAM 22.

Figure 4A:
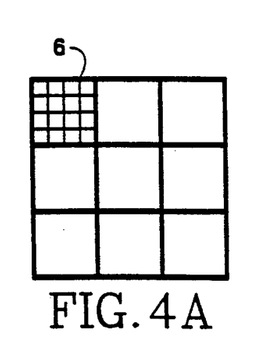
FIG. 4A illustrates a half tone cell scheme having no offset.
Figure 4B:
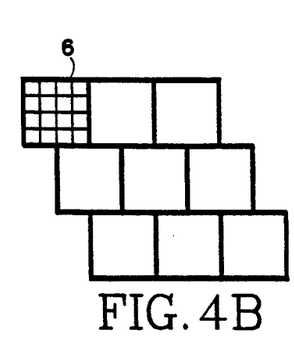
FIG. 4B illustrates a half tone cell scheme having a horizontal offset.
Figure 4C:
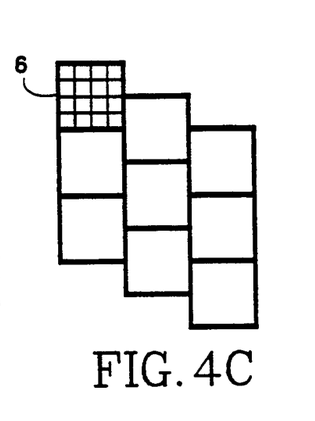
FIG. 4C illustrates a half tone cell scheme having a vertical offset.

The half tone pixel processor 24 of the present invention implements selectively either a monochrome or multiple color half toning scheme to give each printed line an apparent color intensity determined by the intensity level data included in the description of the line provided by main processor 18. The dimensions (i.e., the number of pixels in vertical and horizontal directions) and intensity threshold levels of half tone cells used by pixel processor 24 are programmably adjustable. In addition, pixel processor 24 may provide a programmably determined vertical or horizontal offset when mapping half tone cells onto a page. FIG. 4A illustrates relative positioning of nine cells 6 of a half tone cell array having no offset. FIG. 4B illustrates an alternative arrangement of the same nine cells 6 when the half tone cell array has a horizontal offset of, for example, +2 pixels. That is, each row of half tone cells is offset from the next row above by two pixels in a +x direction (i.e., to the right in FIG. 4B). FIG. 4C shows the same nine cells 6 when the half tone cell array has a vertical offset of −1 (in a −Y direction) wherein each column of half tone cells is offset from the preceding row above by one pixel. Vertical or horizontal offset can reduce occurrence of noticeable pixel patterns in low intensity lines.

Before transmitting a picture description to main processor 18, the graphic design system provides set-up instructions including data indicating monochrome or multiple (three or four) color mode of operation, the amount and direction of cell offset, half tone cell dimensions and intensity threshold levels. In response, the main processor 18 stores control data in addressable registers and other storage devices within pixel processor 24. The pixel processor uses the control data to determine the desired half tone scheme when subsequently converting line descriptions to pixel data.

A port 30 connects a printer controller 28 for printer 12 to bus 26. Bus 26 includes a set of control lines used by ports 16 and 30, main processor 18 and pixel processor 24 to arbitrate for access to bus 26. When pixel processor 24 completes adjusting the bit map in RAM 22, main processor 18 commands printer controller 28 to sequentially read out the pixel data stored in RAM 22 and to transmit control data to printer 12 causing the printer to print out the graphic page defined by the bit map.

Figure 5:
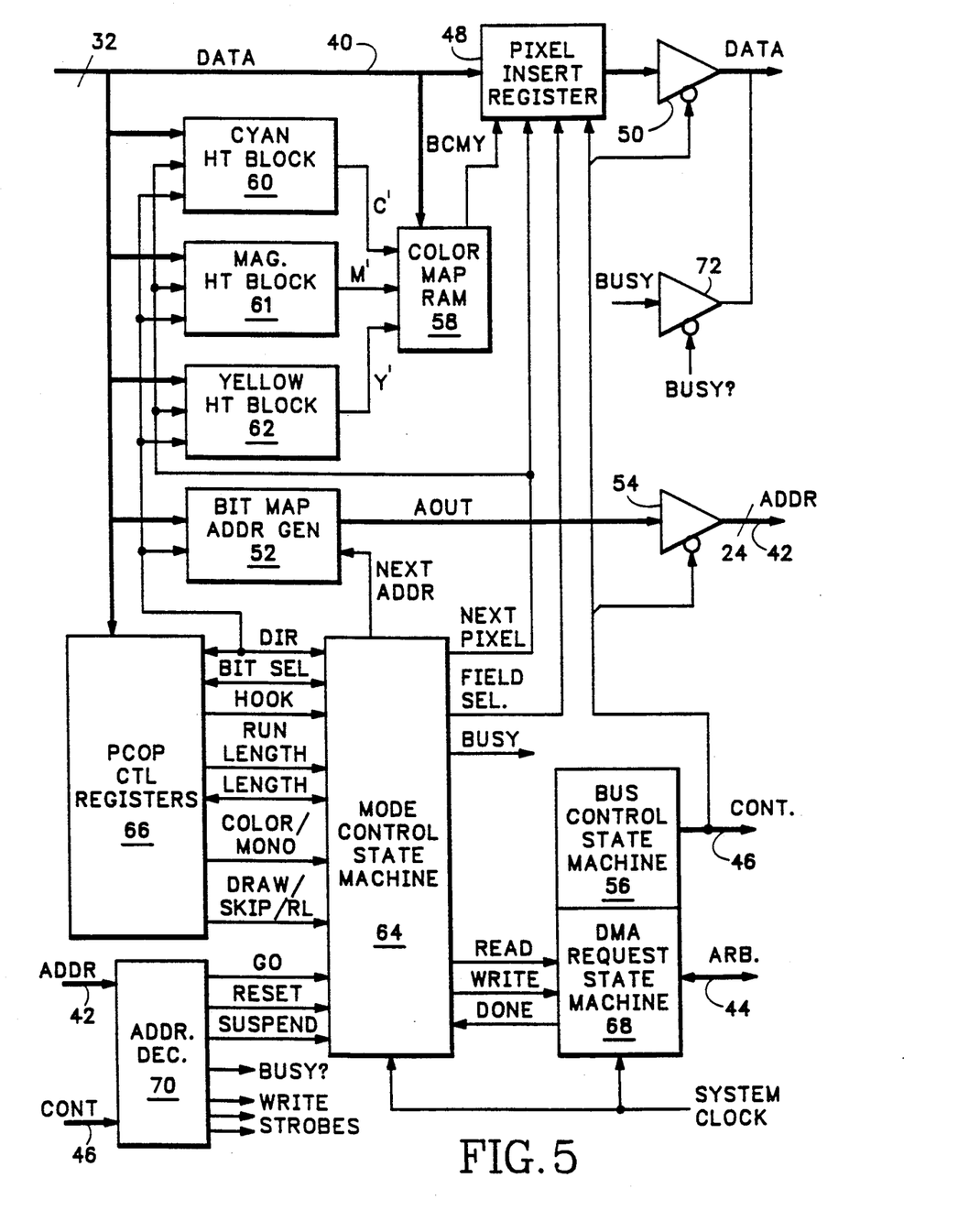
FIG. 5 illustrates the pixel processor of FIG. 2 in more detailed block diagram form.

FIG. 5 illustrates the pixel processor 24 of FIG. 2 in more detailed block diagram form. Bus 16 of FIG. 2 is the standard bus for the Motorola model 68020 microprocessor and includes a 32-bit data bus 40, a 24-bit address bus 42, a set of arbitration lines 44, and control lines 46. A pixel insert register 48 stores each pixel data word read out of RAM 22 of FIG. 2 via data bus 40. When processing a line, the pixel processor adjusts states of one or more bits of the pixel data word stored in pixel insert register 48. The pixel processor thereafter places the altered pixel data word back on data bus 40 via a tristate buffer 50 and writes the data word back into the bit map. During both read and write operations, a bit map address generator 52 places the appropriate RAM address on address bus 42 via a tristate buffer 54. A bus control state machine 56 clocked by a system clock signal generates the appropriate control signals on bus control lines 46 to implement the memory read or write cycle.

As previously mentioned, the state of each bit of the 32-bit pixel data word stored in pixel insert register 48 controls whether a corresponding pixel on the printed page is on or off. For a monochrome printer, each 32-bit pixel data word may control 32 horizontally contiguous pixels. For a four color printer, each 32-bit pixel data word may control as many as 8 pixels of each of the four primary color types. The manner in which the bit map is mapped onto a page is determined by printer controller 28 of FIG. 2 and depends on the type of printer it drives. The states of up to four selected data bits of a pixel data word stored in pixel insert register 48 are simultaneously set in accordance with states of output data bits B, C, M, and Y produced by a color map RAM 58 in response to input bits from cyan, magenta and yellow half tone blocks 60, 61 and 62, respectively. For a monochrome printer, only one bit of the pixel data word is adjusted at a time to a state indicated by the C output bit of RAM 58. For a three color printer, the pixel processor simultaneously sets three bits of the pixel data word in accordance with the CMY RAM 58 output bits. For a four color printer, the pixel processor simultaneously sets four bits of the pixel data word in accordance with all four RAM 58 output bits.

Each half tone block 60-62 stores data indicating intensity threshold levels of the half tone cell for the corresponding primary color and also stores data indicating the intensity level for a line being processed. For each cyan pixel along the path of a line, cyan half tone block 60 determines the position of the pixel within the half tone block, compares the threshold level of the pixel with the desired intensity level of the line, and generates its output bit C' indicating whether the intensity threshold level is less than the desired line intensity. The magenta and yellow half tone blocks 61 and 62 are identical to the cyan half tone block 60 but they store intensity threshold data for the magenta and yellow half tone cells. When the cyan half tone block 60 generates its C' output bit indicating the on/off state of a cyan pixel, the magenta and yellow half tone blocks 61 and 62 generate M' and Y' output bits indicating on/off states of adjacent magenta and yellow pixels. The C', M' and Y' bits address color map RAM 58, and RAM 58 reads out an addressed four bit data word BCMY. The main processor may load data into the color map via data bus 40, during system set up to adjust for differences in color schemes used by printers. While loading data into RAM 58, four lines of data bus 40 control data input terminals of the color map RAM 58 and three lines of the data bus control address terminals of the color map RAM.

A mode control state machine 64 clocked by system clock signal responds to data stored in a set of control registers 66 indicating line direction (DIR), line length (number of pixels), color or monochrome mode (i.e., whether the printer is three or four color or monochrome), and draw, skip or run length mode. (The latter three modes are described in more detail hereinbelow.) A 5-bit PIXEL SELECT field stored in control registers 66 tells the mode control state machine 64 which bit or set of bits within the data word in pixel insert register 48 to process. The mode control state machine 64 generates a FIELD SELECT output signal to select the particular bit or bits of the 32-bit pixel data word stored in pixel insert register 48 set in accordance with the current color map RAM 58 output.

The mode control state machine 64 also transmits a "next address" signal to bit map address generator 52 whenever the pixel processor is to read a pixel data word out of the bit map and store the word in pixel insert register 48. In response, the bit map address generator 52 alters its current address output AOUT to buffer 54 to select the pixel data word containing the next pixel in the line path. State machine 64 transmits a READ request signal to a DMA (direct memory access) request state machine 68, also clocked by the system clock signal. State machine 68 uses arbitration lines 44 to obtain control of bus 26 of FIG. 2 in a well-known manner. When state machine 68 obtains control of the bus, the state machine transmits a read request signal to bus control state machine 56. State machine 56 sets buffer 54 to place the AOUT address on address bus 42 and transmits control signals on control lines 46 causing RAM 22 to read out onto data bus 40 the pixel data word at that address and causing pixel insert register 48 to store the pixel data word. Thereafter, the bus control state machine 56 returns a signal to DMA request state machine 68 indicating that it has completed the requested read operation. State machine 68 thereupon transmits a DONE signal back to mode control state machine 64.

At this point the mode control state machine begins sequentially transmitting NEXT PIXEL signal pulses to each half tone block 60-62 and to pixel insert register 48. Each NEXT PIXEL pulse tells the half tone blocks to compare the intensity threshold data for a next pixel along the path of the line with the desired intensity level of the line and to set output bits C', M' and Y' to appropriate states. Each NEXI PIXEL pulse tells the pixel insert register to store one or more of the current output bits of color map RAM 58 in place of one or more bits of the pixel data word stored in the pixel insert register. The FIELD SELECT signals select the bit or bits of the pixel data word replaced. The mode control state machine 64 sets the FIELD SELECT signals in concert with the NEXT PIXEL pulses such that successive outputs of the color map RAM replace successive bits of the pixel data word.

When all bits in the line path have been appropriately adjusted within the pixel data word stored in pixel insert register 48, the mode control state machine 64 transmits a wRITE signal to DMA request state machine 68. State machine 68 again gains control of the system bus and requests the bus control state machine 56 to write pixel data into the bit map RAM. Bus control state machine 56 sets buffer 50 to place the pixel data content of pixel insert register 48 on data bus 40, sets buffer 54 to again place the address output AOUT of address generator 52 on address bus 42, and then asserts control signals 46 to write the pixel data on data bus 40 back into RAM 22 of FIG. 2. Thereafter, bus control state machine 56 turns off buffers 50 and 54 and returns an acknowledge signal to DMA request state machine 68. DMA request state machine 68 again transmits the DONE signal to mode control state machine 64 to announce that the pixel data word was written back into memory. If the pixel processor has not yet processed all pixels of the line, mode control state machine 64 initiates another pixel data word read/write/modify cycle by transmitting another NEXT ADDRESS signal pulse to the bit map address generator 52. The process continues until all pixel data words containing pixels along the path of the line have been read, modified, and written back into the bit map memory.

As mentioned hereinabove, at the beginning of each read/modify/write cycle, the bit map address generator 52 generates the pixel data word addresses for read/modify/write operations. Main processor 18 of FIG. 2 may alter the output address of address generator 52 by supplying a new address via data bus 40 as the "origin" part of the description of a line to be drawn. If a bit corresponding to the origin pixel of a line is included in the same pixel data word as a bit corresponding to the endpoint pixel of a last drawn line, the main processor need not alter the address output of the address generator.

The direction data bits DIR stored in one of control registers 66 are also input to address generator 52. The address generator includes an arithmetic logic unit that selectively increments or decrements the last AOUT address by a predetermined step amount to generate a new address output AOUT in response to each NEXT ADDRESS pulse. The DIR data controls how the address is incremented or decremented. The DIR data includes four bits $+X$, $-X$, $+Y$ and $-Y$. For example, if only the $+X$ bit is set, the line extends horizontally to the right of its origin. If only the $-X$ bit is set, the line extends to the left. If the $+X$ and $+Y$ bits are set, the line extends to the right of its origin at a 45 degree angle from horizontal. Thus, it will be appreciated that four direction bits may represent any of eight line directions. If the line extends horizontally in the $-X$ or $+X$ directions, the address generator 52 decrements or increments the address by one. If the line extends vertically in the $-Y$ or $+Y$ directions, the address generator decrements or increments the address by M, where M is the fixed number of pixel data words controlling pixels along one horizontal (X) line of the page. If the line extends to the left or right of its origin at a + or − 45 degree angle from horizontal, the address generator increments or decrements the address by $M+1$ or $M-1$ depending on line direction. The printer controller maps pixel data words in the bit map onto the page in a manner consistent with this scheme.

The cyan, magenta, and yellow half tone blocks 60-62 include storage devices for receiving coordinate data from the main processor 18 via data bus 40, the coordinate data indicating the position within their respective half tone cells of a pixel at the origin of a line. The coordinate data and previously stored data indicating the intensity threshold values assigned to each pixel of a half tone cell tell the half tone block which intensity threshold value to assign to the pixel at the origin of the line. As each half tone block receives each NEXT pIXEL pulse the half tone block updates the pixel coordinate data so that it points to a new intensity value for a next pixel in the path of the line in accordance with the stored half tone cell data. During system set up, the main processor supplies each half tone block with offset data indicating how half tone cells are offset, and with data indicating cell dimension. The direction bits DIR stored in registers 66 also control the half tone cells 60-62. The direction bits, along with the stored offset and cell dimension data all tell the half tone blocks how to adjust the pixel coordinate data to point to the appropriate next intensity threshold value after processing each pixel.

An address decoder 70 decodes addresses on address bus 42 in response to signals on control lines 46. When the main processor transmits data via data bus 40 to a control register 66, to a half tone block 60-62, to bit map address generator 52, or to color map RAM 58, it places an appropriate address on the address bus 42 and asserts signals on control lines 46. These signals cause address decoder 70 to transmit an output strobe signal pulse enabling the register or device to receive the data. One particular address on address bus 42 tells the address decoder to transmit a GO signal to mode control state machine 64. This signal tells state machine 64 to start processing a line. A RESET output bit of address decoder 70 resets state machine 64 to an initial state on system start up or rebooting. The main processor may set true a latched SUSPEND signal output of decoder 70 by placing one particular address on address bus 42 to suspend state machine 64 operation. The main processor sets the SUSPEND signal output false to resume state machine operation by placing another address on address bus 42.

While the pixel processor is actively processing pixel data for a line, the mode control state machine 64 continues to assert a BUSY output bit. When the main processor wishes to transmit data to the pixel processor, it periodically determines whether the pixel processor is busy by causing address decoder 70 to assert an output BUSY? signal. The BUSY? signal causes buffer 72 to place the BUSY bit on a line of the data bus 40. The state of the BUSY bit on data bus 40 tells the main processor when the pixel processor has completed processing the line.

Figure 6:
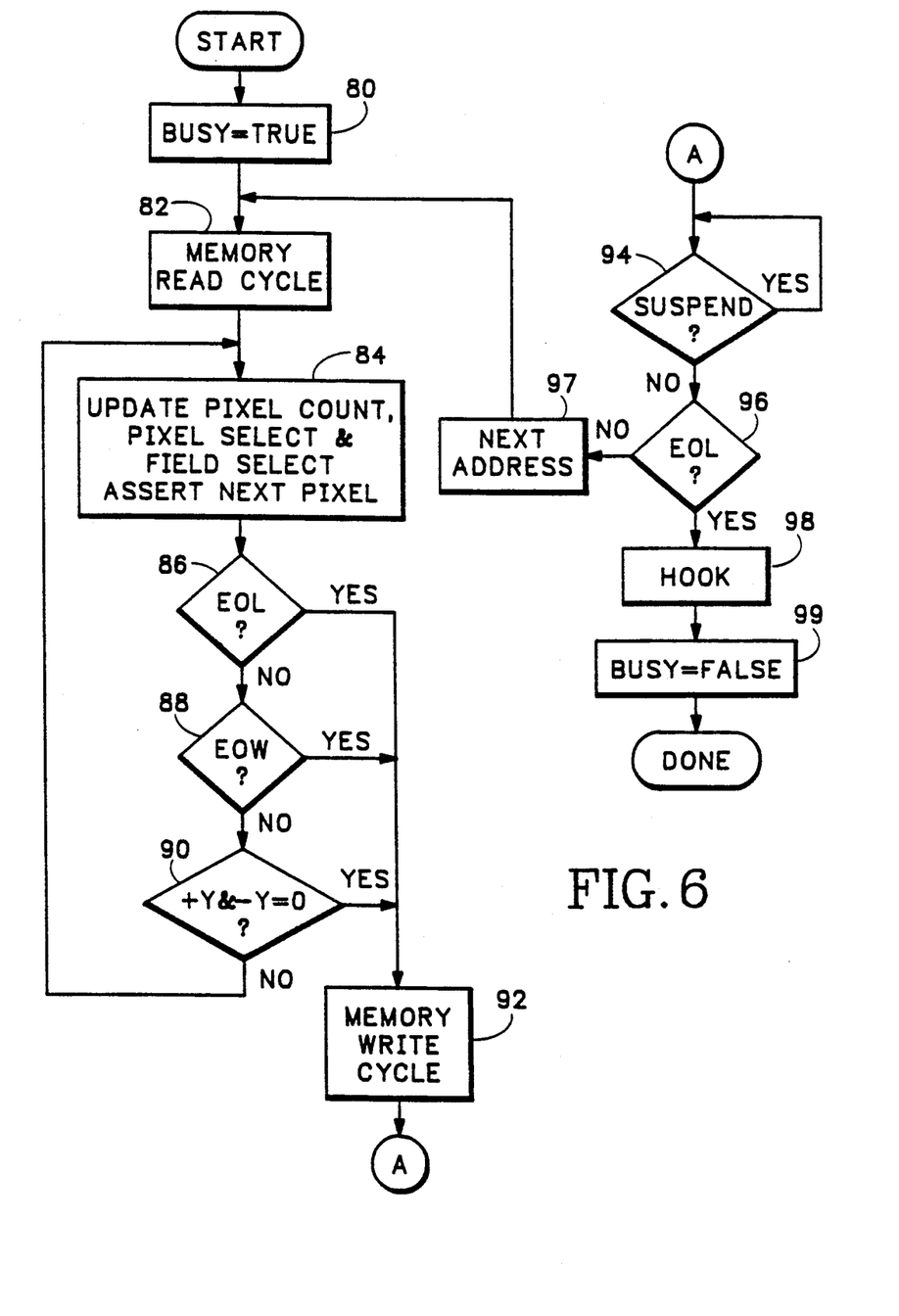
FIGS. 6–8 are flow charts depicting modes of operation of the mode control state machine of FIG. 5.

As previously mentioned, the mode control state machine 64 operates in any of three modes: draw, skip or run length. The main processor selects the current mode of operation by storing data in control registers 66. FIG. 6 illustrates the steps carried out by the mode control state machine when the pixel processor operates in the draw mode. Referring to FIGS. 5 and 6, on receipt of a GO signal, the state machine 64 sets its BUSY output bit true (step 80) and initiates a first bit map memory read cycle (step 82) by transmitting a READ request to DMA request state machine 68. Thereafter, pixel insert register 48 stores the pixel data word containing a bit or bits corresponding to the origin of the line. Next, mode control state machine 64 sets its FIELD SELECT signal to select the storage location within pixel insert register 48 of the bit corresponding to the origin pixel indicated by the BIT SELECT input data from control registers 66 and generates a NEXT PIXEL pulse (step 84). (If the COLOR/MONO input signal to state machine 64 indicates one of the color modes, the state machine sets the FIELD SELECT signal to select storage locations of the three or four color pixels at the line origin.)

In response to the NEXT PIXEL pulse, the pixel insert register 48 replaces the selected bit or bits with output from color map RAM 58 and the half tone blocks 60-62 determine whether the next pixels of the line should turn on or off. State machine 64 updates a count of pixels processed (step 84) and if the count reaches the length of the line indicated by the LENGTH data in control registers 66, the state machine knows the pixel processor has completed line processing. Also in step 84, the state machine updates (increments or decrements depending on whether the +X or -X direction bits are set) the PIXEL SEL bits in the control registers to represent a position of the next bit or bits in the pixel data word.

After generating the NEXT PIXEL pulse in step 84, the mode control state machine determines from the pixel count whether the pixel processor has processed the pixel or pixels at the end of the line (EOL) (step 86). If not, the state machine determines from the PIXEL SEL and DIR fields whether the pixel processor has processed the last bit of the pixel data word in the insert register (step 88). If not, the state machine checks the +Y and -Y direction (DIR) input bits to determine if the line has a vertical component. If not, the state machine knows that an additional bit of the pixel data word must be processed. In such case, the state machine returns to step 84, adjusts the FIELD SELECT signal to select the next bit or bits of the pixel data word and generates another NEXT PIXEL signal pulse to set the states of the selected bits in the pixel insert register 48.

The state machine continues to loop through steps 84, 86, 88 and 90 until all bits of the pixel data word in the pixel insert register corresponding to pixels in the line path have been appropriately set. When the result of any of the tests of steps 86, 88 or 90 is YES, the state machine initiates a pixel data write cycle (step 92) where the pixel data word is written back into the bit map. The state machine then checks the SUSPEND input bit to determine if it should suspend its operation (step 94). The state machine continues to loop through step 94 until the SUSPEND input bit is reset. If the pixel processor has not processed the pixels or pixels at the end of the line (step 96), the state machine asserts a NEXT ADDRESS signal pulse (step 97) causing the bit map address generator 52 to alter its output to address a next pixel data word. The state machine then reverts to step 82 to initiate a new memory read cycle and continues to loop through steps 82-97 until in step 96 the state machine determines the pixel processor has processed all pixels in the line.

Before initiating a pixel processing operation, the main processor stores a 4-bit HOOK field in the control registers that is similar to the direction DIR field in that the four bits represent a direction. When the HOOK field is non-zero, the pixel processor alters its internal data to indicate the origin of a next line to be processed is offset by one pixel from the last pixel of the line just processed in a direction represented by the HOOK field. Thus, when the start of the next line to be drawn is adjacent the end of the last line drawn, the main processor need not alter data in the pixel processor representing the origin of the next line before initiating the next line processing operation. After the state machine determines that the pixel processor has completed processing a line (step 96), it carries out a "hook" operation (step 98). In the hook operation it replaces the DIR field in the control registers with the HOOK field and initiates another NEXT PIXEL pulse causing the half tone blocks to update the pixel position with the half tone blocks. If the state machine determines from the direction field and the BIT SEL field that the next pixel is within another pixel data word, the state machine also transmits a NEXT ADDRESS pulse to the bit map address generator causing it to update its output address. The state machine then sets the BUSY signal false (step 99) and stops operating.

Figure 7:
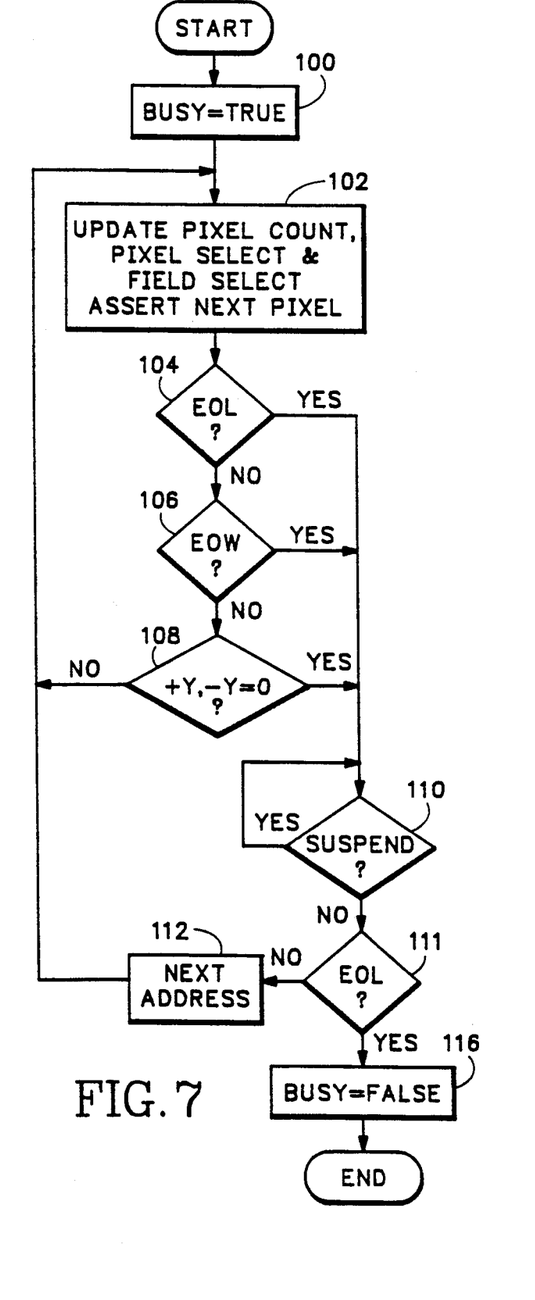

FIG. 7 is a flow chart illustrating the "skip" mode of pixel processor operation. In the skip mode the pixel processor operates as in the draw mode but does not read, modify or write any pixel data words to reflect a new line in the bit map. The skip mode of operation is a way to adjust the data stored in the pixel processor indicating the origin of a line. To set up the skip mode, the main processor sets the DRAW/SKIP/RL field to indicate skip mode operation, adjusts the LENGTH field to tell the pixel processor how many pixels are between the end of the last line drawn and the origin of the next line to be drawn, and adjusts the DIR field to represent the direction of the path between the endpoint of the last line and the origin of the next line. The main processor then initiates the GO signal input to the state machine.

Referring to FIG. 7, the mode control state machine sets the BUSY bit true (step 100) and asserts a NEXT PIXEL pulse (step 102) causing the half tone blocks to update pixel coordinates within the half tone cells. Also in step 102, the state machine updates the pixel count for the line and the PIXEL SEL and FIELD SELECT fields. The state machine then checks the pixel count for end of line (step 104), checks the PIxEL SEL field and DIR bits to determine if the pixel processor has finished processing a pixel data word (End Of Word, step 106) and checks the DIR bits to determine if the line has a vertical component (step 108). If the results of the tests of steps 104, 106 and 108 are all NO, the state machine reasserts the NEXT pIXEL pulse (step 102). The state machine continues to loop through steps 102-108 until the result of any of the tests of steps 104, 106 or 108 is yes. In such case the state machine suspends its operation, if necessary, while the SUSPEND bit is true (step 110). Thereafter, the state machine determines if the pixel processor has processed pixels at the end of the line (End Of Line, step 111) and if not, the state machine asserts a NEXT ADDRESS pulse (step 112) and continues to loop through steps 100-112 until the pixel processor has processed all pixels of the line as determined in step 111. At this point the state machine sets the BUSY bit false (step 116) and ends its operation.

The run length mode permits the system to quickly process a dashed line wherein the length of each dash, and the spaces between the dashes, are of adjustable length. The main processor sets up the pixel processor for a run length mode operation by supplying the pixel processor with almost the same data needed to set up a draw mode operation. However, instead of providing the LENGTH data, the main processor provides a 32-bit data word including successive four bit fields representing lengths of successive dashes and spaces of the dashed line. The main processor also sets the DRAW/SKIP/RL field to indicate the run length mode of operation instead of the draw mode.

Figure 8:
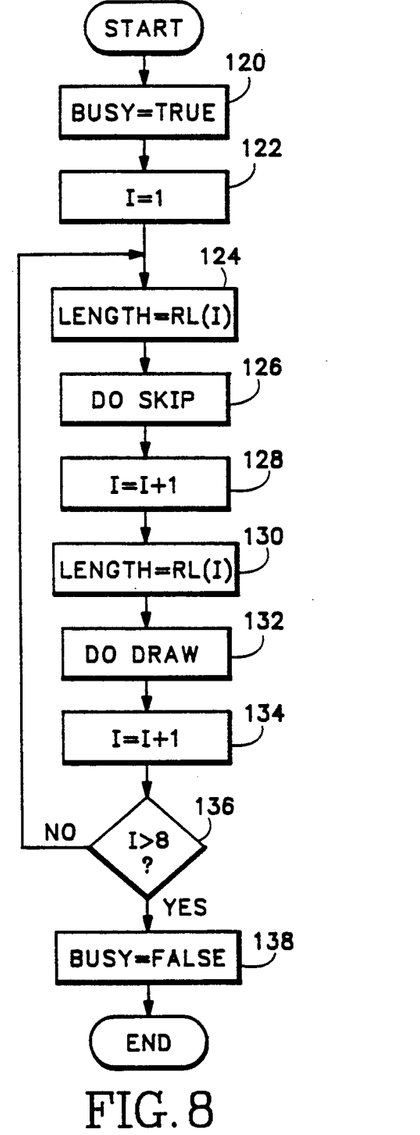

FIG. 8 is a flow chart illustrating operation of the mode control state machine for the run length mode. On receipt of a GO signal, the state machine sets the BUSY signal true (step 120) and sets a counter I equal to 1 (step 122). Thereafter, the state machine sets the LENGTH field equal to the value of the Ith 4-bit field RL(I) of the RUN LENGTH data (step 124). The first RUN LENGTH field RL(1) indicates the number of pixels (from 0 to 15) to skip. The state machine carries out a skip operation similar to that illustrated in FIG. 7 (step 126) to move the origin of a next line to be drawn of direction and distance represented by the DIR and LENGTH fields. The state machine increments I (step 128) and sets the LENGTH field equal to RL(I) (step 130). The second RUN LENGTH field RL(2) indicates a number of pixels (from 0 to 15) spanned by the first dash of the line. Then the state machine carries out a draw operation similar to that illustrated in FIG. 6 (step 132) to draw a line of length and direction represented by the DIR and LENGTH fields. The state machine again increments I (step 134), and if I is not greater than 8 (the number of 4-bit fields in the 32-bit RUN LENGTH data), the state machine reverts to step 124. The state machine loops through steps 124-136 until it determines in step 136 that I is greater than 8, indicating the dashed line has been fully processed. The state machine then sets BUSY false (step 138) and ends its operation.

Figure 9:
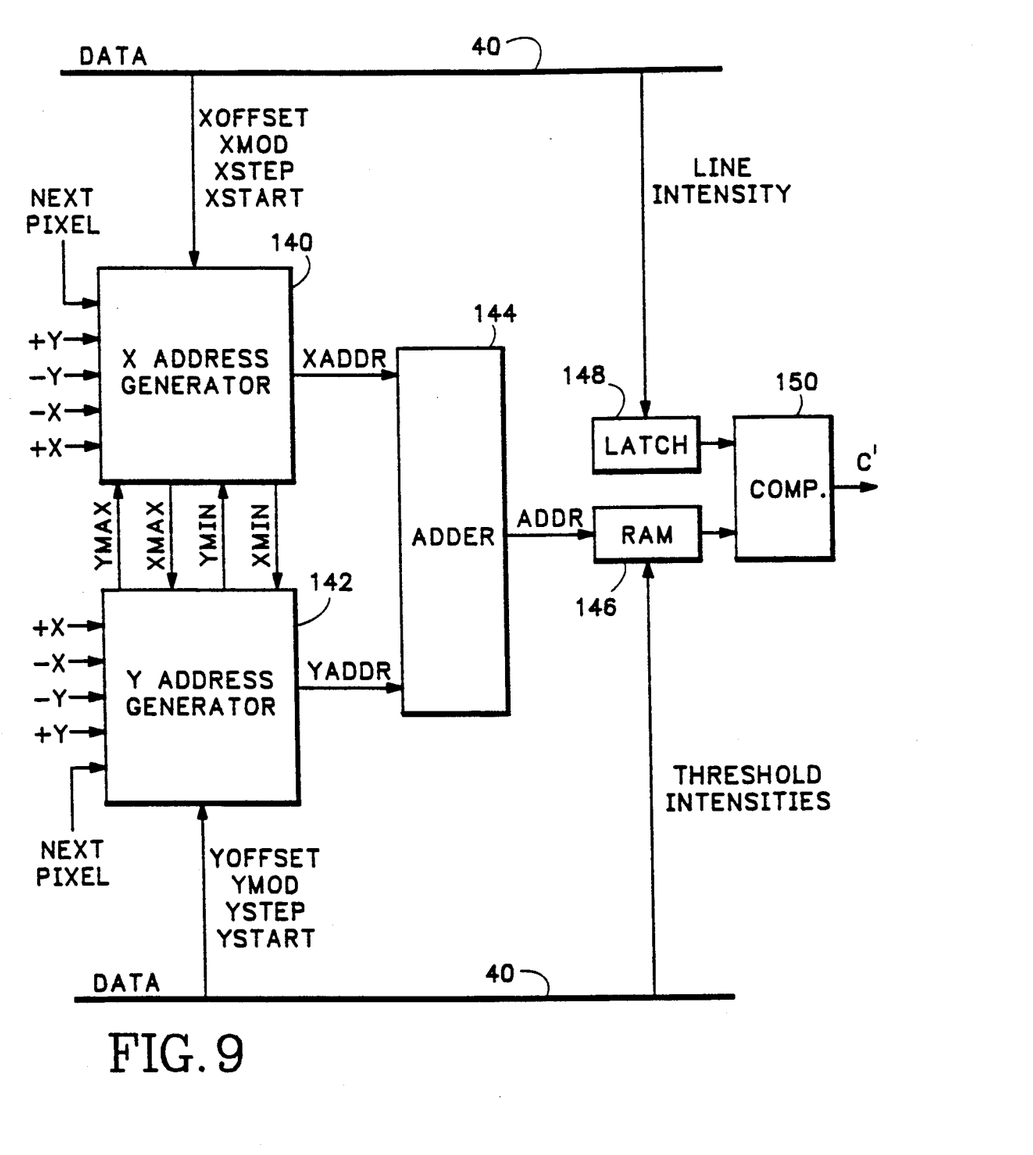
FIG. 9 illustrates a typical half toning circuit of FIG. 5 in more detailed block diagram form.

FIG. 9 illustrates cyan half tone block 60 of FIG. 5 in more detailed block diagram form. Magenta and yellow half tone blocks 61 and 62 are similar. The half tone block includes an X address generator 140, a Y address generator 142, an adder 144, a RAM 146, a latch 148, and a comparator 150. RAM 146 stores intensity threshold data for each pixel of a half tone cell at a separate address. The main processor supplies this intensity data via data bus 40. In response to each NEXT PIXEL pulse, the X and Y address generators generate XADDR and YADDR coordinate data indicating an X,Y position of a pixel within the half tone cell. Adder 144 adds XADDR and YADDR to address RAM 146. The main processor arranges the intensity threshold data stored in RAM 146 such that RAM 146 reads out the appropriate intensity threshold data for the pixel to an input of comparator 150. Latch 148 latches data from bus 40 indicating the desired intensity threshold of the line onto another input of comparator 150. Comparator 150 produces the C' output of the half tone block indicating when the line intensity data from latch 148 equals or exceeds the pixel intensity threshold data output of RAM 146.

The half tone cell is a variable number (XMOD) of pixels wide in the X direction and a variable number (YMOD) of pixels high in the Y direction. During system set up, the main processor stores in the X and Y address generators 140 and 142 the XMOD and YMOD data, as well as data (XOFFSET, YOFFSET) indicating the X and Y offset of the half tone cell array, and data (XSTEP and YSTEP) indicating how to increment or decrement XADDR and YADDR for a given cell size. The $+X$, $-X$, $+Y$, $-Y$ direction (DIR) data stored in the control registers 66 of FIG. 5 are also input to X and Y address generators. These data inputs tell the X and Y address generators how to increment or decrement their output address values in response to each NEXT PIXEL pulse. During a set up operation, the main processor may also load initial values XSTART, YSTART for XADDR and YADDR into the X and Y address generators via data bus 40.

Figure 10:
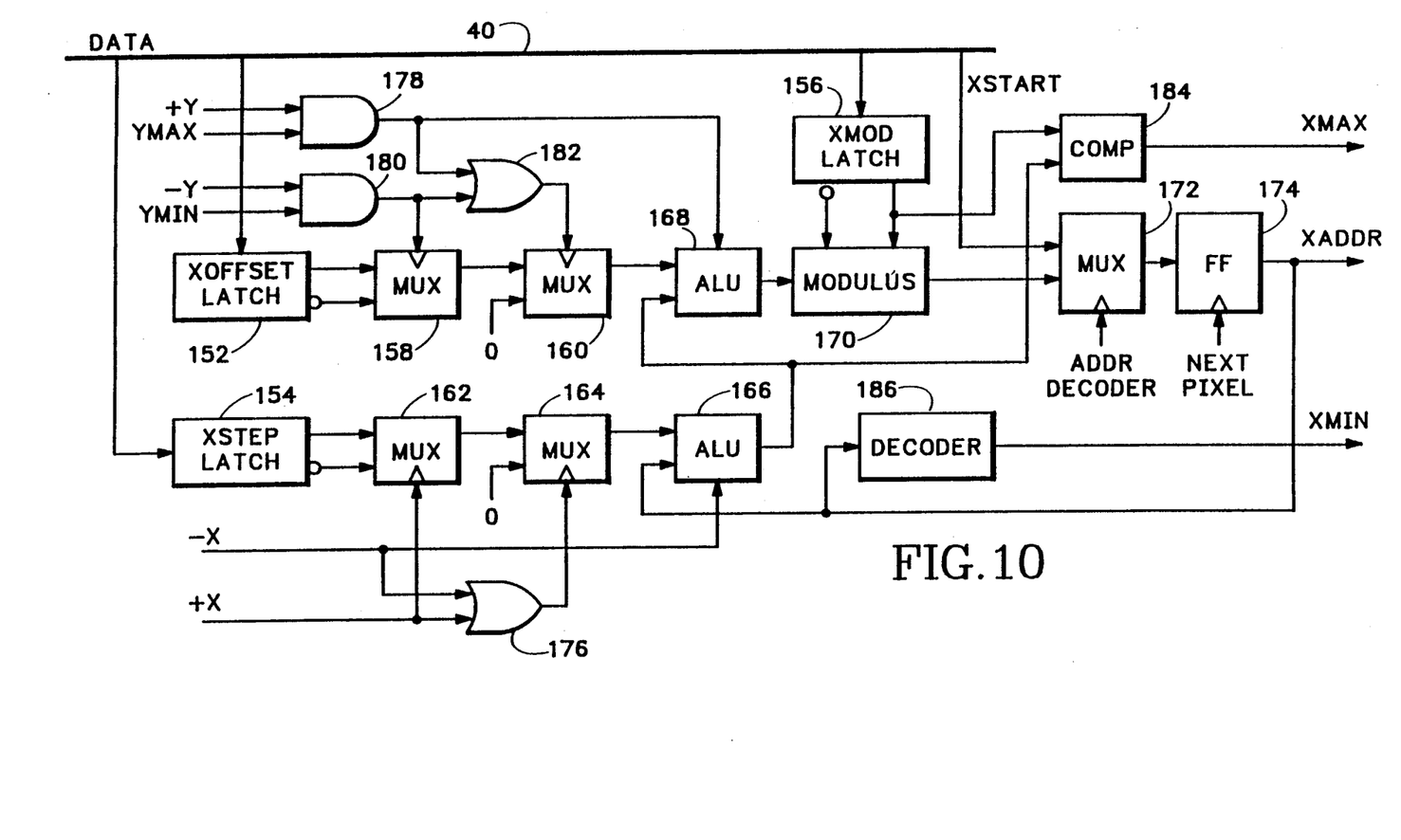
FIG. 10 illustrates the X address generator of FIG. 9 in more detailed block diagram form.

FIG. 10 illustrates the X address generator 140 of FIG. 9 in more detailed block diagram form. Referring to FIG. 10, the X address generator includes a set of latches 152, 154 and 156 for storing data indicating the X offset of the half tone cell pattern (XOFFSET), a step amount for incrementing XADDR (XSTEP), and the width of the half tone cell in number of pixels (XMOD). (For normal operation XSTEP is set to one.) The XOFFSET latch 152 includes inverting and non-inverting outputs applied as alternative inputs to a multiplexer 158. The output of multiplexer 158, selectively either $+$XOFFSET or $-$XOFFSET, drives one input of a multiplexer 160 and a zero data value drives a second input of multiplexer 160. The XSTEP latch also includes inverting and non-inverting outputs connected to inputs of a multiplexer 162. The output of multiplexer 162, selectively either $+$XSTEP or $-$XSTEP, drives an input of a multiplexer 164. A second input of multiplexer 164 is set to zero. An arithmetic logic unit (ALU) 166 selectively adds or subtracts the output of multiplexer 164 to or from the last XADDR value produced by the XADDR generator. A second ALU 168 selectively adds or subtracts the output of multiplexer 160 to or from the output of ALU 166. A modulus block 170 passes the output of ALU 168 to another multiplexer 172 if the output of ALU is not greater than the value of XMOD stored in latch 156. Otherwise, modulus block 170 passes the difference between the output of ALU 168 and XMOD to multiplexer 172. During normal operation, multiplexer 172 forwards the output of modulus block 170 to a flip-flop 174 clocked by the NEXT PIXEL signal. The output of flip-flop 174 is the current XADDR output of the X address generator. When the mode control state machine generates a NEXT PIXEL pulse, flip-flop 174 clocks its input onto its output, thereby updating XADDR. Data bus 40 supplies the XSTART data to another input of multiplexer 172. The main processor may set XADDR to XSTART during system set up to select a new line origin along the X axis of the half tone cell by placing the XSTART value on bus 40 and switching multiplexer 172 to pass that value to flip-flop 174.

The −X direction bit controls multiplexer 162. If −X is set, multiplexer 162 selects −XSTEP (i.e., −1) as its output and otherwise selects +XSTEP (i.e., +1). An OR gate 176 ORs the +X and −X bits to produce an output controlling multiplexer 164. The −X bit also controls whether ALU 166 adds or subtracts. Thus, when either −X or +X is set, the line has a horizontal component and ALU 166 increments or decrements XADDR depending on whether the next processed pixel is to the right or left of the last pixel processed within the half tone cell.

An AND gate 178 ANDs +Y and a YMAX bit produced by the Y address generator, while an AND gate 180 ANDs −Y and a YMIN bit also produced by the Y address generator. AN OR gate 182 ORs the outputs of AND gates 178 and 180. The output of AND gate 180 controls switching of multiplexer 158, the output of OR gate 182 controls switching of multiplexer 160, and the output of OR gate 178 controls whether ALU 168 adds or subtracts. The YMAX and YMIN bits indicate when the next pixel to be processed is within a half tone cell above or below the half tone cell containing the last pixel processed. If the line has a vertical component, multiplexer 160 passes +XOFFSET or −XOFFSET to ALU 168 and ALU 168 adds or subtracts this offset value to or from the output of ALU 168 depending on the direction of the line. If there is no offset, the value of XOFFSET is set to zero. However, if the half tone cells are offset in the X direction by one or more pixels to the left or right, the XOFFSET is a positive or negative value reflecting the amount of offset. Thus, ALU 168 further increments or decrements XADDR by XOFFSET to account for the X offset at cell boundaries.

A comparator 184 compares the output of ALU 166 to a non-inverting output of latch 156, the comparator asserting an XMAX signal when its inputs are equal indicating that the current pixel is at the rightmost boundary of the half tone cell. The XADDR output of flip-flop 174 drives a decoder 186 asserting an XMIN output when XADDR is zero. The XMIN signal indicates when the current pixel is at the left most boundary of the half tone cell. The XMAX and XMIN signals provide input to the Y address generator for use when half tone cells are vertically offset.

The Y address generator is topologically identical to the X address generator but has different inputs and outputs. In the Y address generator, latches 152, 154 and 156 store data indicating an amount of half tone cell pattern Y direction offset (YOFFSET), a step amount for incrementing YADDR (YSTEP), and the height of the half tone cell (YMOD). Multiplexer 172 selectively passes a starting YADDR value (YSTART) from bus 40 to flip-flop 174. While under normal operation XSTEP is always set to one in the X address generator, YSTEP is set equal to the width of the half tone cell. The Y address generator must increment or decrement YADDR by the width of the half tone cell in order to address intensity threshold data corresponding to a pixel of the half tone cell immediately above or below the pixel of the half tone cell corresponding to the last addressed intensity threshold data. In the Y address generator comparator 184, decoder 186, and flip-flop 174 produce YMAX, YMIN, and YADDR. The +X and XMAX signals provide inputs to AND gate 178 and the −X and XMIN signal drive AND gate 180. The −Y and +Y signals drive OR gate 176.

There has thus been described a preferred embodiment of a pixel processor for converting data indicating origin, direction, length and intensity of each of a set of lines forming a picture into a half tone bit map of the picture. The pixel processor organizes the picture into an adjustably offset array of similar half tone cells, storing adjustable data indicating the size of a half tone cell, the amount and direction of offset, and an intensity threshold level for each pixel of a half tone cell. When processing each line, the pixel processor reads pixel data words out of the bit map, each pixel data word including at least one bit corresponding to a pixel along the path of the line. For each such bit, the pixel processor determines the half tone cell position of the corresponding pixel, determines whether the intensity threshold level assigned to that half tone cell position is lower than the intensity level of the line and sets the state of the bit accordingly. After suitably altering relevant bits of each pixel data word, the pixel processor writes the altered pixel data word back into the bit map memory.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. For a pixel processing system including a bit map memory storing pixel data bits, each pixel data bit corresponding to a separate pixel of a half tone cell array forming a graphic design and controlling appearance in said graphic design of said pixel data bit's corresponding pixel, a half tone pixel processor comprising:

means for storing object description data indicating intensity and positioning relative to said half tone cell array of a graphic object to be included in said graphic design;

addressable memory means for storing at various addresses pixel intensity threshold data corresponding to each pixel of a half tone cell and for reading out said pixel intensity threshold data when addressed;

addressing means for determining from said stored object description data an address within said addressable memory means of pixel intensity threshold data corresponding to a particular pixel of said half tone cell array spanned by said graphic object when said graphic object is included in said graphic design, said addressing means addressing said addressable memory means with the determined address such that said addressable memory means reads out pixel intensity threshold data corresponding to the particular pixel;

a comparator for comparing the intensity indicated by said object description data to the pixel intensity threshold data read out of said addressable memory means and producing an output bit indicating a result of the comparison; and means for setting a state of a bit stored in said bit map memory corresponding to said particular pixel in response to a state of said output bit.

2. The pixel processor in accordance with claim 1 wherein said object is a line and wherein said object description data indicates an origin of said line within said half tone cell array, a direction of said line from said origin, and a number of pixels of said half tone cell array spanned by said line when said line is included in said graphic design.

3. The pixel processor in accordance with claim 1 wherein said addressing means comprises:

means for generating an X address value proportional to a horizontal position of said particular pixel within a half tone cell;

means for generating a Y address value proportional to a vertical position of said particular pixel within said half tone cell; and means for combining said X and Y address values to produce an address for addressing said addressable memory means.

4. The pixel processor in accordance with claim 3 wherein said means for combining comprises means for adding said X and Y address values to produce said address for addressing said addressable memory means.

5. For a pixel processing system including a bit map memory storing pixel data words, each pixel data word comprising a plurality of bits, each bit of each pixel data word processing to a separate pixel of a half tone cell array forming a graphic design, each bit controlling appearance in said graphic design of said bit's corresponding pixel, a half tone pixel processor comprising:

data storage means storing origin data indicating an origin pixel within said half tone cell array of a line to be included in said graphic design, storing length data indicating a number of pixels of said half tone cell array spanned by said line, storing direction data indicating a direction of said line from said origin pixel, and storing line intensity data indicating intensity of said line;

addressable memory means storing at various addresses pixel intensity threshold data corresponding to pixels of a half tone cell and reading out said pixel intensity threshold data when addressed;

addressing means for determining from said stored origin, length and direction data addresses within said addressable memory means of pixel intensity threshold data corresponding to particular pixels of said half tone cell array spanned by said line when said line is included in said graphic design, and for sequentially addressing said addressable memory means with the determined addresses such that said addressable memory means reads out a sequence of pixel intensity threshold data corresponding to the particular pixels;

a comparator for successively comparing the stored line intensity data to the sequence of pixel intensity threshold data read out of said addressable memory means and for producing a sequence of output bits, each successive output bit indicating a result of a successive comparison; and means for reading out of said bit map memory and storing a first pixel data word comprising particular bits corresponding to said particular pixels, for setting states of said particular bits of said stored first pixel data word in accordance with states of said output bits thereby to produce a second pixel data word, and for writing said second pixel data word into said bit map memory in place of said first pixel data word.

6. The pixel processor in accordance with claim 5 wherein said addressing means comprises:

means for generating a sequence of X address values indicating horizontal positions of said particular pixels within a half tone cell;

means for generating a sequence of Y address values indicating vertical positions of said particular pixels within said half tone cell; and means for combining said X and Y address values to produce a sequence of addresses for addressing said addressable memory means.

7. For a pixel processing system including a bit map memory storing pixel data bits, each pixel data bit corresponding to a separate pixel of a half tone cell array forming a graphic design and each pixel data bit controlling appearance in said graphic design of said pixel data bit's corresponding pixel, each half tone cell comprising a rectangular pixel array of adjustable horizontal and vertical dimensions, a half tone pixel processor responsive to input origin data indicating an origin pixel within said half tone cell array of a line to be included in said graphic design, length data indicating a number of pixels of said half tone cell array spanned by said line, direction data indicating a direction of said line from said origin pixel, line intensity data indicating intensity of said line, and X and Y dimension data respectively indicating said horizontal and vertical dimensions, the half tone pixel processor comprising:

means for storing said input origin, length, direction, intensity, and X and Y dimension data;

addressable memory means storing at various addresses pixel intensity threshold data corresponding to each pixel of a half tone cell and reading out said pixel intensity threshold data when addressed;

addressing means for determining from said stored origin, length, direction and X and Y dimension data addresses within said addressable memory means of pixel intensity threshold data corresponding to particular pixels of said half tone cell array spanned by said line, and for successively addressing said addressable memory means with said addresses such that said addressable memory means successively reads out a sequence of pixel intensity threshold data corresponding to the particular pixels;

a comparator for successively comparing the stored line intensity data to the sequence of pixel intensity threshold data read out of said addressable memory means and for producing a sequence of output bits, each successive output bit indicating a result of a successive comparison; and means for setting states of bits stored in said bit map memory corresponding to said particular pixels in response to states of said output bits.

8. The pixel processor in accordance with claim 7 wherein said addressing means comprises:
  means for generating a sequence of X address values indicating horizontal positions of said particular pixels within half tone cell;
  means for generating a sequence of Y address values indicating vertical positions of said particular pixels within said half tone cell; and
  means for combining said X and Y address value sequences to produce a sequence of addresses for addressing said addressable memory means.

9. The pixel processor in accordance with claim 8 wherein said means for generating a sequence of Y address values comprises:
  latching means for successively latching input addresses to produce said sequence of Y address values; and
  logic means for generating said sequence of input address values to said latching means, each successive input address value being determined by a combination of said origin, length, direction and X and Y dimension data, and a Y address value produced by said latching means.

10. For a pixel processing system including a bit map memory storing pixel data bits, each pixel data bit corresponding to a separate pixel of a half tone cell array forming a graphic design and controlling appearance in said graphic design of said pixel data bit's corresponding pixel, each half tone cell comprising a rectangular pixel array of adjustable horizontal and vertical dimensions, a half tone pixel processor responsive to input origin data indicating an origin pixel within said half tone cell array of a line to be included in said graphic design, length data indicating a number of pixels of said half tone cell array spanned by said line, direction data indicating a direction of said line from said origin pixel, line intensity data indicating intensity of said line, dimension data indicating horizontal and vertical dimensions of a half tone cell, and offset data indicating the adjustable offset of said half tone cell array, the half tone pixel processor comprising:
  means for storing said input origin, length, direction, intensity, X and Y dimension and offset data;
  addressable memory means for storing at various addresses input pixel intensity threshold data corresponding to each pixel of a half tone cell and for reading out said input pixel intensity threshold data when addressed;
  addressing means for determining from said stored origin, length, direction, X and Y dimension and offset data addresses within said addressable memory means of pixel intensity threshold data corresponding to particular pixels of said half tone cell array spanned by said line, and for sequentially addressing said addressable memory means with the determined addresses such that said addressable memory means successively reads out a sequence of pixel intensity threshold data corresponding to the particular pixels;
  a comparator for successively comparing the stored line intensity data to the sequence of pixel intensity threshold data read out of said addressable memory means and producing a sequence of output bits, each successive output bit indicating a result of a successive comparison; and
  means for setting states of bits stored in said bit map memory corresponding to said particular pixels in response to states of said output bit.

11. For a pixel processing system including a bit map memory storing pixel data bits, each pixel data bit corresponding to a separate pixel of a half tone cell array forming a graphic design and each said data bit controlling appearance in said graphic design of said data bit's corresponding pixel, a half tone pixel processing method comprising the steps of:
  storing input object description data indicating intensity and positioning relative to said half tone cell array of a graphic object to be included in said graphic design;
  storing at various addresses of an addressable memory means pixel intensity threshold data corresponding to each pixel of a half tone cell array.
  determining from said stored object description data an address within said addressable memory means of pixel intensity threshold data corresponding to a particular pixel of said half tone cell array spanned by said graphic object when said graphic object is included in said graphic design;
  addressing said addressable memory means with said address such that said addressable memory means read out said pixel intensity threshold data;
  comparing the intensity indicated by said object description data to the pixel intensity threshold data read out of said addressable memory means and producing an output bit indicating a result of the comparison; and
  setting a state of a bit stored in said bit map memory corresponding to said particular pixel in response to a state of said output bit.

12. The method in accordance with claim 11 wherein said object is a line and wherein said object description data indicates an origin of said line within said half tone cell array, a direction of said line from said origin, and a number of pixels of said half tone cell array spanned by said line when said line is included in said graphic design.

13. The method in accordance with claim 11 wherein the step of determining an address comprises the substeps of:
  generating an X address value proportional to a horizontal position of said particular pixel within a half tone cell;
  generating a Y address value proportional to a vertical position of said particular pixel within said half tone cell; and
  adding said X and Y address values to produce said address.

14. For a pixel processing system including a bit map memory storing pixel data words, each pixel data word comprising a plurality of pixel data bits, each pixel data bit corresponding to a separate pixel of a half tone cell array forming a graphic design and each pixel data bit controlling appearance in said graphic design of said pixel data bit's corresponding pixel, a half tone pixel processing method comprising the steps of:
  storing origin data indicating an origin pixel within said half tone cell array of a line to be included in said graphic design;
  storing length data indicating a number of pixels of said half tone cell array spanned by said line,
  storing direction data indicating a direction of said line from said origin pixel, storing line intensity data indicating intensity of said line;

storing at various addresses in an addressable memory pixel intensity threshold data corresponding to pixels of a half tone cell;

determining from said stored origin, length and direction data, addresses within said addressable memory of pixel intensity threshold data corresponding to particular pixels of said half tone cell array spanned by said line when said line is included in said graphic design, sequentially addressing said addressable memory means with the determined addresses such that said addressable memory means reads out a sequence of said pixel intensity threshold data corresponding to the particular pixels;

successively comparing the stored line intensity data to the sequence of said pixel intensity threshold data read out of said addressable memory means;

producing a sequence of output bits, each successive output bit indicating a result of a successive comparison;

reading a first pixel data word out of said bit map memory, said first pixel data word comprising particular pixel data bits corresponding to said particular pixels; and setting states of said particular pixel data bits of the read out first pixel data word in response to states of said output bits.

15. The method in acocrdance with claim 14 wherein the step of determining addresses comprises the substeps of:

generating a sequence of X address values indicating horizontal positions of said particular pixels within a half tone cell;

generating a sequence of Y address values indicating vertical positions of said particular pixels within said half tone cell; and adding said X and Y address value sequences to produce a sequence of addresses for addressing said addressable memory means.

16. For a pixel processing system including a bit map memory storing pixel data bits, each pixel data bit corresponding to a separate pixel of a half tone cell array forming a graphic design and controlling appearance in said graphic design of said pixel data bit's corresponding pixel, each half tone cell comprising a rectangular pixel array of adjustable horizontal and vertical dimensions, a half tone pixel processing method responsive to input origin data indicating an origin pixel within said half tone cell array of a line to be included in said graphic design, length data indicating a number of pixels of said half tone cell array spanned by said line, direction data indicating a direction of said line from said origin pixel, line intensity data indicating intensity of said line, and X and Y dimension data respectively indicating said horizontal and vertical dimensions, the half tone pixel processing method comprising the steps of:

storing said input origin, length, direction, intensity, and X and Y dimension data;

storing at various addresses of an addressable memory means pixel intensity threshold data corresponding to each pixel of a half tone cell;

determining from said stored origin, length, direction and X and Y dimension data a sequence of addresses within said addressable memory means of pixel intensity threshold data corresponding to particular pixels of said half tone cell array spanned by said line, addressing said addressable memory means with said sequence of addresses such that said addressable memory means successively reads out a sequence of said pixel intensity threshold data corresponding to the particular pixels;

successively comparing the stored line intensity data to the sequence of pixel intensity threshold data read out of said addressable memory means and producing a sequence of output bits, each successive output bit indicating a result of a successive comparison; and setting states of bits stored in said bit map memory corresponding to said particular pixels in response to states of said output bits.

17. The method in accordance with claim 16 wherein the step of determining addresses comprises:

generating a sequence of X address values indicating horizontal positions of said particular pixels within a half tone cell;

generating a sequence of Y address values indicating vertical positions of said particular pixels within said half tone cell; and combining said X and Y address value sequences to produce said sequence of addresses addressing said addressable memory means.

18. For a pixel processing system including a bit map memory storing pixel data bits, each pixel data bit corresponding to a separate pixel of a half tone cell array forming a graphic design and controlling appearance in said graphic design of said pixel data bit's corresponding pixel, each half tone cell comprising a rectangular pixel array of adjustable horizontal and vertical dimensions, a half tone pixel processing method responsive to input origin data indicating an origin pixel within said half tone cell array of a line to be included in said graphic design, length data indicating a number of pixels of said half tone cell array spanned by said line, direction data indicating a direction of said line from said origin pixel, line intensity data indicating intensity of said line, dimension data indicating horizontal and vertical dimensions of a half tone cell, and offset data indicating the adjustable offset of said half tone cell array, the half tone pixel processing method comprising the steps of:

storing said input origin, length, direction, intensity, X and Y dimension and offset data;

storing at various addresses in an addressable memory means pixel intensity threshold data corresponding to each pixel of a half tone cell;

determining from said stored origin, length, direction, X and Y dimension and offset data a sequence of addresses within said addressable memory means of pixel intensity threshold data corresponding to particular pixels of said half tone cell array spanned by said line, sequentially addressing said addressable memory means with the sequence of addresses such that said addressable memory means successively reads out a sequence of said pixel intensity threshold data corresponding to the particular pixels;

successively comparing the stored line intensity data to the sequence of pixel intensity threshold data read out of said addressable memory means and producing a sequence of output bits, each successive output bit indicating a result of a successive comparison; and setting states of bits stored in said bit map memory corresponding to said particular pixels in response to states of said output bits.

* * * * *